(12) United States Patent
Skudelny

(10) Patent No.: US 6,619,833 B1
(45) Date of Patent: Sep. 16, 2003

(54) CHURNING, BEATING AND DISLODGING KITCHEN UTENSIL

(76) Inventor: Kai Skudelny, Via della Miniera 8, I-39018 Terlano (IT)

( * ) Notice: Subject to any disclaimer, the term of this patent is extended or adjusted under 35 U.S.C. 154(b) by 49 days.

(21) Appl. No.: 09/709,605

(22) Filed: Nov. 13, 2000

(30) Foreign Application Priority Data

Nov. 29, 1999 (IT) .......................................... /B299A0054

(51) Int. Cl.[7] .................................................. A47J 43/10
(52) U.S. Cl. ........................ 366/129; 99/348; 416/70 R
(58) Field of Search .......................... 366/129, 325.92, 366/325.93, 331, 343, 344; 403/349; 416/69, 70 R, 71, 204 R; 99/348; D7/688, 376, 379, 380, 300.2

(56) References Cited

U.S. PATENT DOCUMENTS

| | | | | |
|---|---|---|---|---|
| 101,128 A | * | 3/1870 | Himmer | |
| D4,001 S | * | 4/1870 | Oblinger | |
| 360,636 A | * | 4/1887 | Wayland | |
| 904,935 A | * | 11/1908 | Brown | |
| 1,281,610 A | * | 10/1918 | Lundahl | |
| 1,391,439 A | * | 9/1921 | Williams | |
| D141,900 S | * | 7/1945 | Latshaw | |
| D154,752 S | * | 8/1949 | Martino | |
| 2,637,537 A | * | 5/1953 | Ernst | |
| D171,434 S | * | 2/1954 | Borgfeldt | |
| 2,732,187 A | * | 1/1956 | Benedetto | |
| 2,833,576 A | * | 5/1958 | Circone | |
| 3,619,081 A | * | 11/1971 | Gruska et al. | |
| 3,810,605 A | * | 5/1974 | Lambert | |
| D304,893 S | * | 12/1989 | Scaggs | |
| 4,946,285 A | * | 8/1990 | Vennemeyer | |
| D313,533 S | * | 1/1991 | Rixen | |
| 5,813,756 A | * | 9/1998 | Proshan | |

* cited by examiner

Primary Examiner—Charles E. Cooley
Assistant Examiner—David L. Sorkin
(74) Attorney, Agent, or Firm—Shlesinger, Fitzsimmons & Shlesinger

(57) ABSTRACT

Churning, beating and dislodging kitchen utensil, comprises a handle including a connecting end; and a work member connected to the connecting end. The work member includes a plurality of blades extending radially from a central hub connected in a disengageable manner to the handle. The hub includes a hemispherical seat with diametrically opposed slits. The connecting end includes a spherical head carrying mutually coaxial pins configured to be inserted in the hemispherical seat and slits, respectively, such that the handle is inclinable about the pins with respect to the work member.

7 Claims, 6 Drawing Sheets

CHURNING, BEATING AND DISLODGING KITCHEN UTENSIL

FIELD OF THE INVENTION

The present invention relates to a churning, beating and dislodging kitchen utensil.

BACKGROUND OF THE INVENTION

So-called kitchen beaters are used for beating mixtures in a pan to bring their consistency and mixing to a final degree for consumption or as an intermediate preparation for further processing. In this case the utensil is made up of a tinned steel wire for beating the mixtures as a whisk. The design of known beaters has the problem that mixtures adhere to the inner wall of the pan and can only be removed from the wall with difficulty because the utensil is not able to reach the particles of the substance on the wall.

In addition the problem of cleaning recipients and especially pans only with difficulty is known because of the lack of suitable cleaning devices.

OBJECTS AND SUMMARY OF THE INVENTION

The general purpose of the present invention is to remedy the above mentioned shortcomings of kitchen utensils of the above described type by proposing the embodiment of a universal utensil capable of churning, beating and dislodging the product to be cooked. Another purpose is to be able to adapt the utensil to the different kitchen recipient situations due to their different conformation or to remove different substances from the walls thereof.

This and other purposes are achieved in accordance with the present invention by a churning, beating and scraping kitchen utensil having a plurality of blades extending radially from a central hub releasably connected to a handle.

Having available a plurality of blades extending from a central body formed as a hub the blades can even reach fillets with a small radius and act simultaneously with elasticity on the substance adhering to the inner wall of the recipient.

Proposing blades with rounded ends the latter can adapt to the fillets between the bottom of a recipient and the vertical wall thereof.

Providing a disengageable coupling between the ends of the handle and the hub of the work member the member can be changed rapidly to choose an available one better suited to another type of recipient. Naturally instead of replacing the work member it would also be possible to replace the handle with a different eccentricity of the grip to be able to use the grip more efficiently.

If listels come diverging from the handle starting from the elbow of the handle in the direction of the free end of the handle, then the tool can be left with the working member raised onto the work table near the cooktop with no danger of fouling the work table.

Further characteristics and details of the churning, beating and dislodging kitchen utensil are set forth in the following description of a preferred embodiment illustrated in the annexed drawings in which:

DETAILED DESCRIPTION OF THE INVENTION

Figure 1:
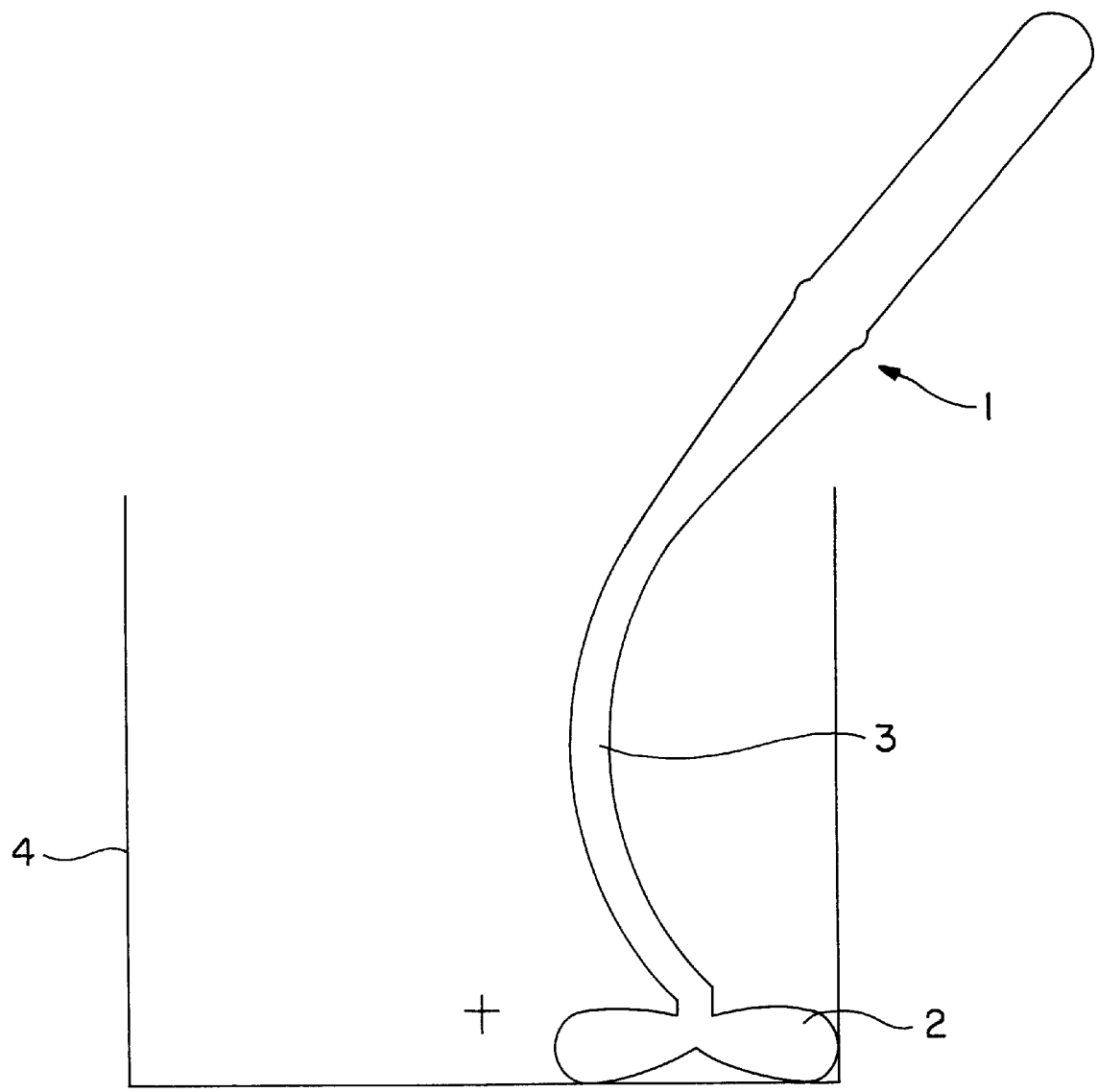
FIG. 1 shows diagrammatically a sketch of a kitchen utensil in a pan also diagrammed.

With reference to the FIGS FIG. 1 shows a kitchen utensil 1 as a whole made up of a work member 2 and a handle 3. The utensil 1 is arranged in a pan 4.

Figure 2:
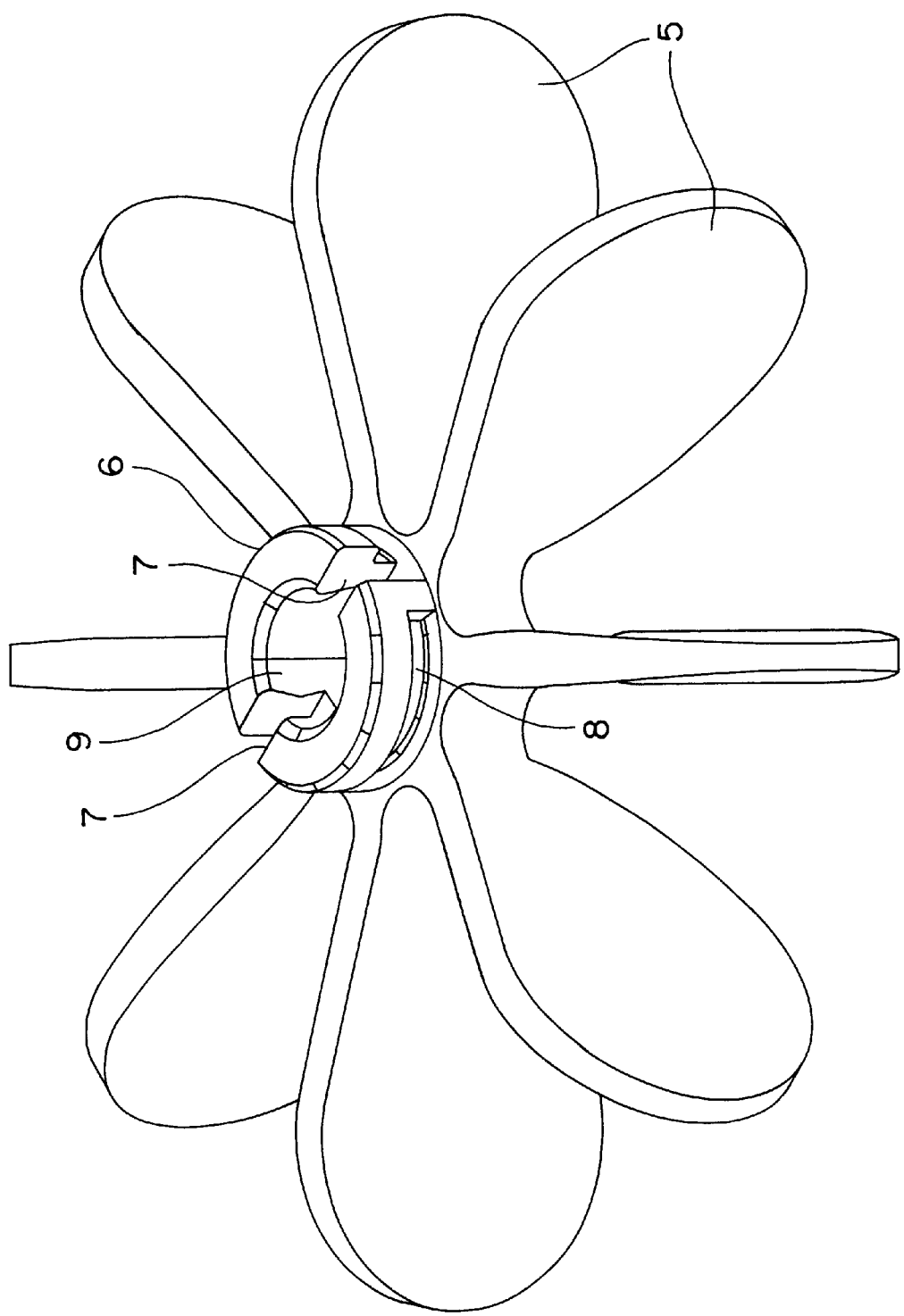
FIG. 2 shows a work member in a diagrammatic perspective view.
Figure 3:
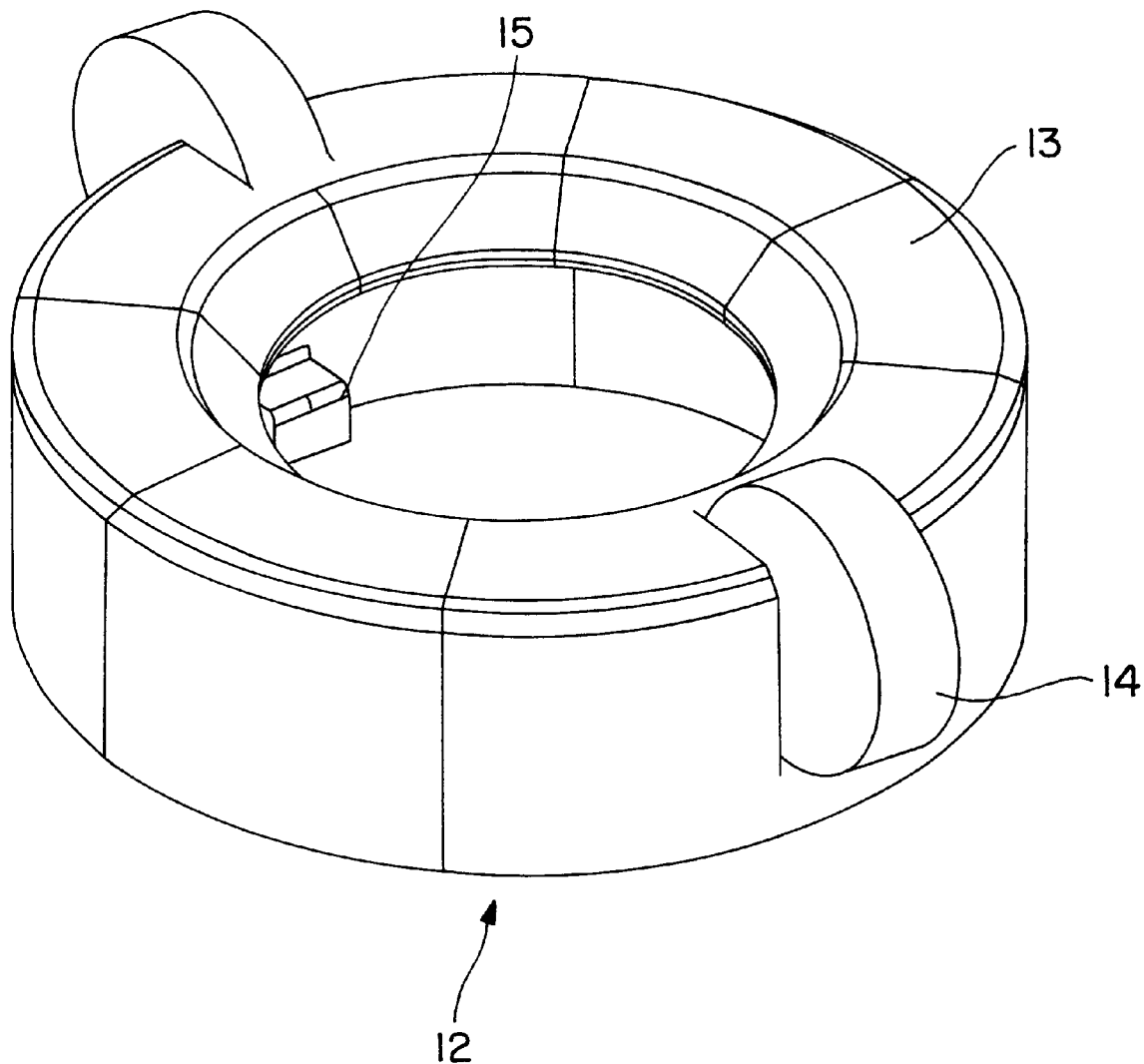
FIG. 3 shows a ring nut with bayonet cuff in a diagrammatic perspective view.

As shown in FIG. 2 the work member 2 is made up of a plurality of blades, eight in this case, which extend from a central body 6 having the form of a hub.

In the hub 6 projecting axially above the blades 5 are made diametrically opposed slits 7 and on the external cylindrical surface of the hub 6 are made grooves 8 inclined with respect to the hub axis.

In the hub 6 is also made a hemispherical seat 9.

The hemispherical seat 9 is designed to receive a spherical head 10 of the handle 3. The spherical head 10 bears mutually coaxial pins 11 designed to be inserted in the slits 7 to house the spherical head 10 in the hemispherical seat 9.

Above the spherical head 10 is fittable a ring nut with cuff 12 above having a radial band 13 within which the handle 3 passes. The ringnut has holds 14 on its external surface to cause snapping of diametrically opposed teeth 15 in the ringnut 12 in the groove 8 and turn the bayonet ringnut in the groove 8.

Figure 4:
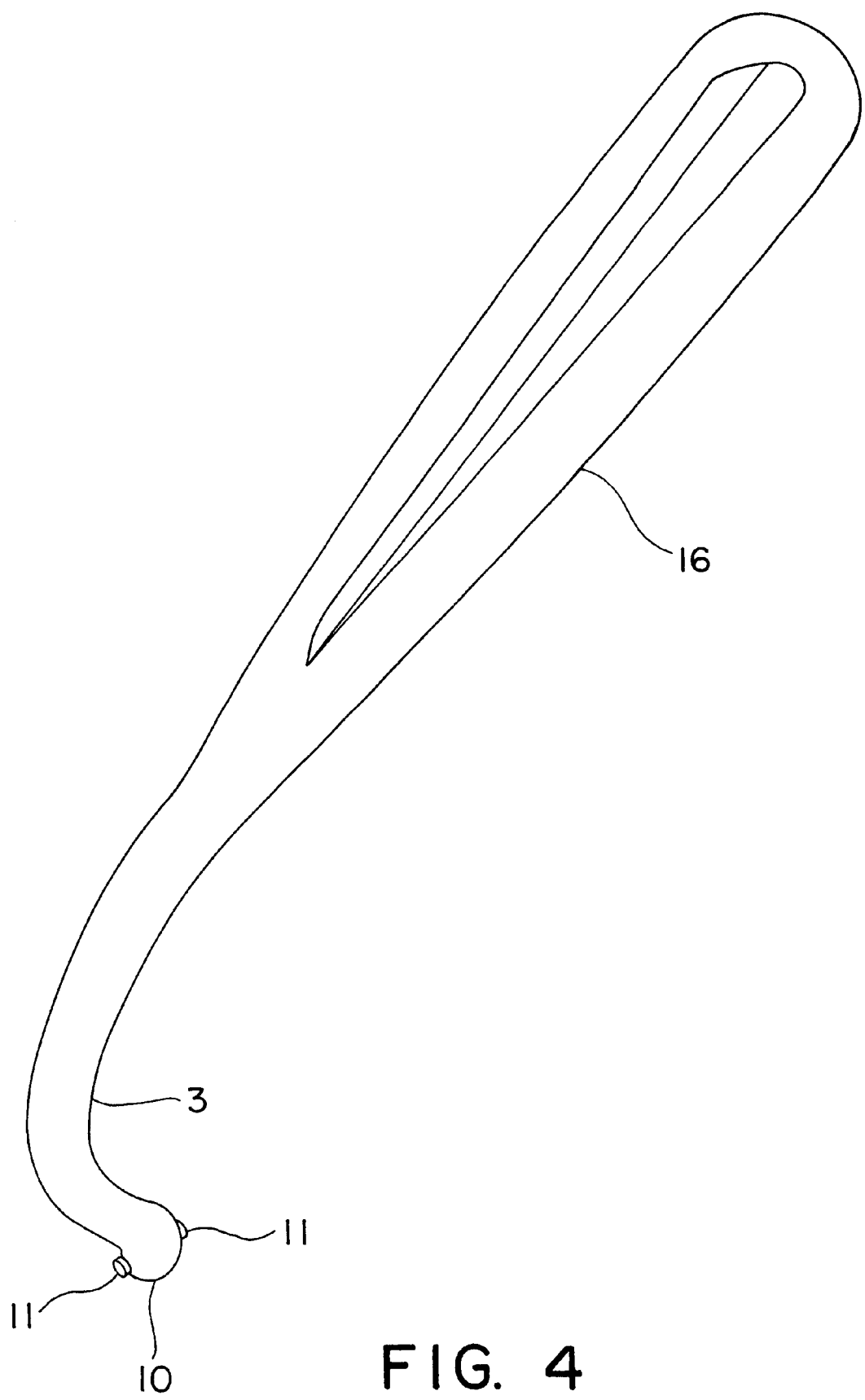
FIG. 4 shows a handle in a first variant in a diagrammatic perspective view.
Figure 5:
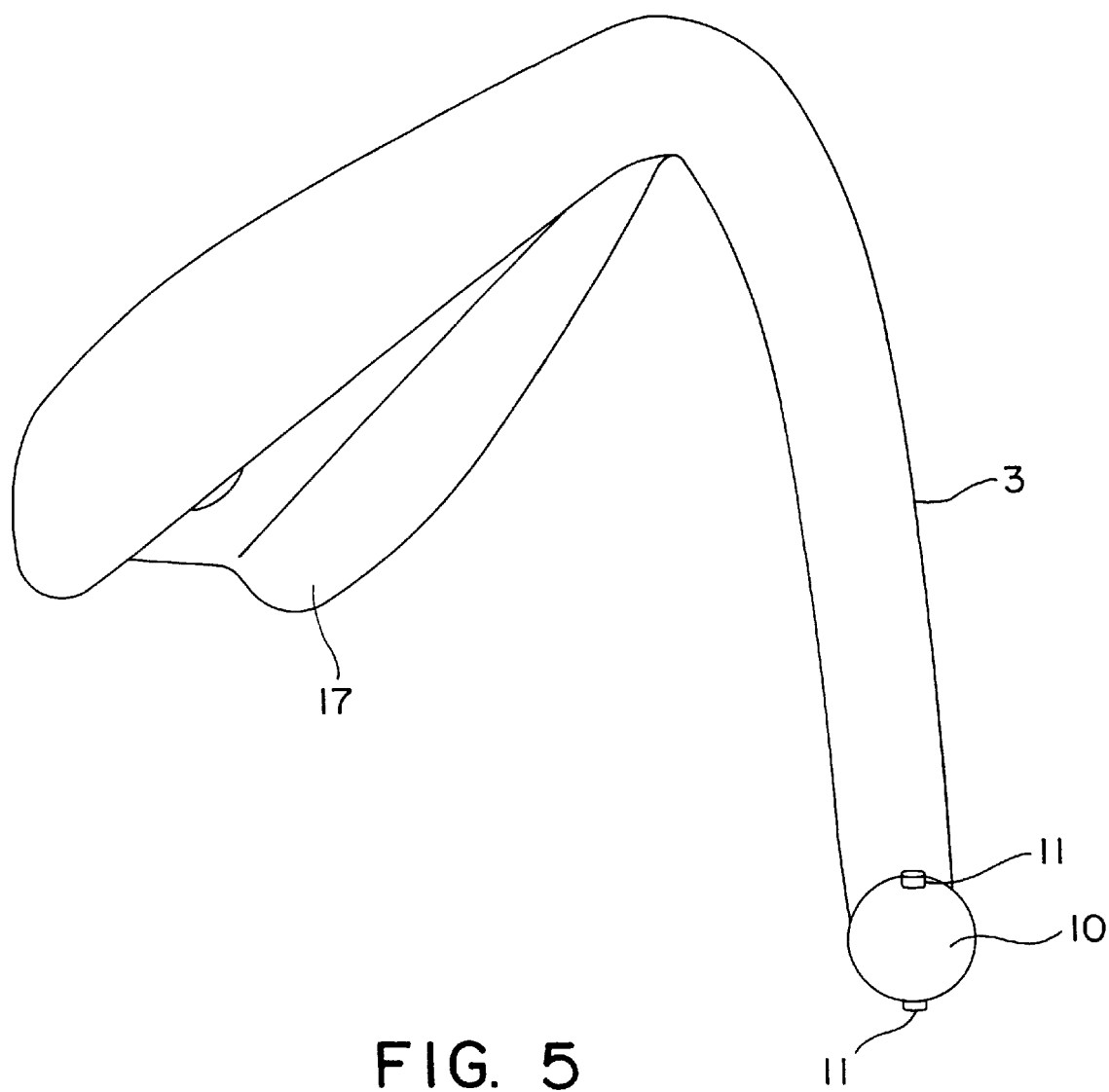
FIG. 5 shows a handle in a second variant in a diagrammatic perspective view.
Figure 6:
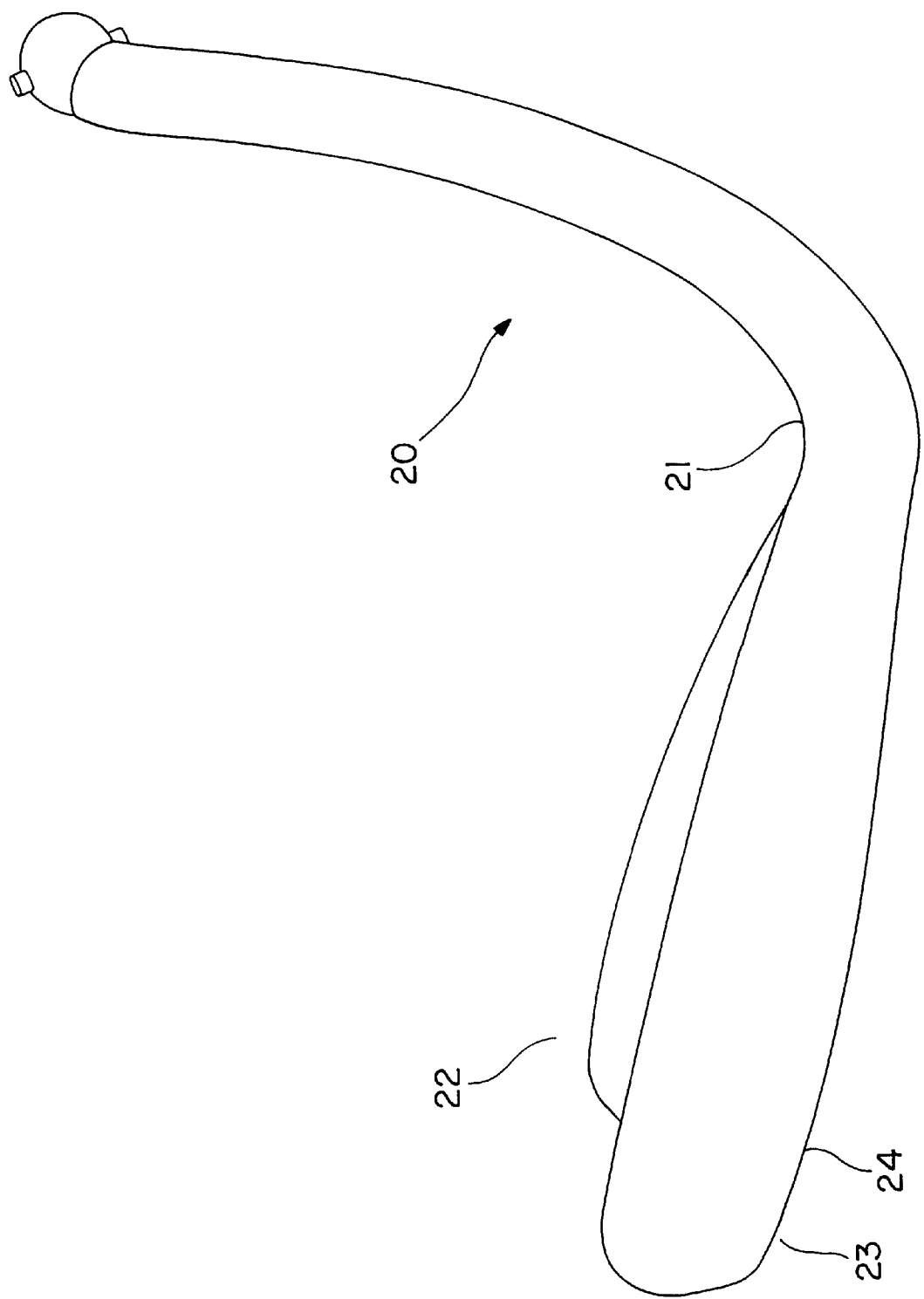
FIG. 6 shows a handle in a third variant.

FIG. 4 shows how the handle 3 has a grip 16 which allows cranking the work member 2. As shown in FIG. 5, to further increase the crank effect, i.e. the lever arm acting on the work member 2, the handle can have a grip 17 essentially right angled to the rotation axis of the work member 2. The variant of FIG. 6 calls for a handle 20 with an elbow 21. From this elbow 21 diverge rods 23 and 24 which opportunely form together with the lower edges, i.e. outside the inner curvature of the elbow 21, a rest for easily leaving the tool with work member raised above the worktable.

What is claimed is:

1. Churning, beating and dislodging kitchen utensil, comprising:
    a) a handle including a connecting end;
    b) a work member connected to said handle at said connecting end;
    c) said work member including a plurality of blades extending radially from a central hub. connected in a disengageable manner to said handle, said hub including a hemispherical seat with diametrically opposed slits; and
    d) said connecting end including a spherical head carrying mutually coaxial pins configured to be inserted in said hemispherical seat and slits, respectively.

2. Utensil as in claim 1, wherein said blades include rounded ends.

3. Utensil as in claim 2, wherein said rounded ends conform with fillets between a wall and a bottom of a kitchen recipient.

4. Utensil as in claim 1, and further comprising a bayonet clamp/to hold said connecting end to said work member.

5. Utensil as in claim 1, wherein said handle includes an elbow.

6. Utensil as in claim 5, wherein said elbow is right angled.

7. Utensil as in claim 5, wherein said handle forms a rest extending from said elbow away from said work member to allow leaving said work member above the worktable without fouling the worktable.

* * * * *